Dec. 15, 1925.

Re. 16,227

E. W. CLARKE

LENS DRILLING MACHINE

Original Filed July 2, 1920 3 Sheets-Sheet 1

INVENTOR
Edward W. Clarke.
BY
Harry H. Styll.
ATTORNEY

Dec. 15, 1925.

Re. 16,227

E. W. CLARKE

LENS DRILLING MACHINE

Original Filed July 2, 1920 3 Sheets-Sheet 2

INVENTOR

Edward W. Clarke.

BY

Harry H. Styll

ATTORNEY

Dec. 15, 1925.
Re. 16,227
E. W. CLARKE
LENS DRILLING MACHINE
Original Filed July 2, 1920 3 Sheets-Sheet 3
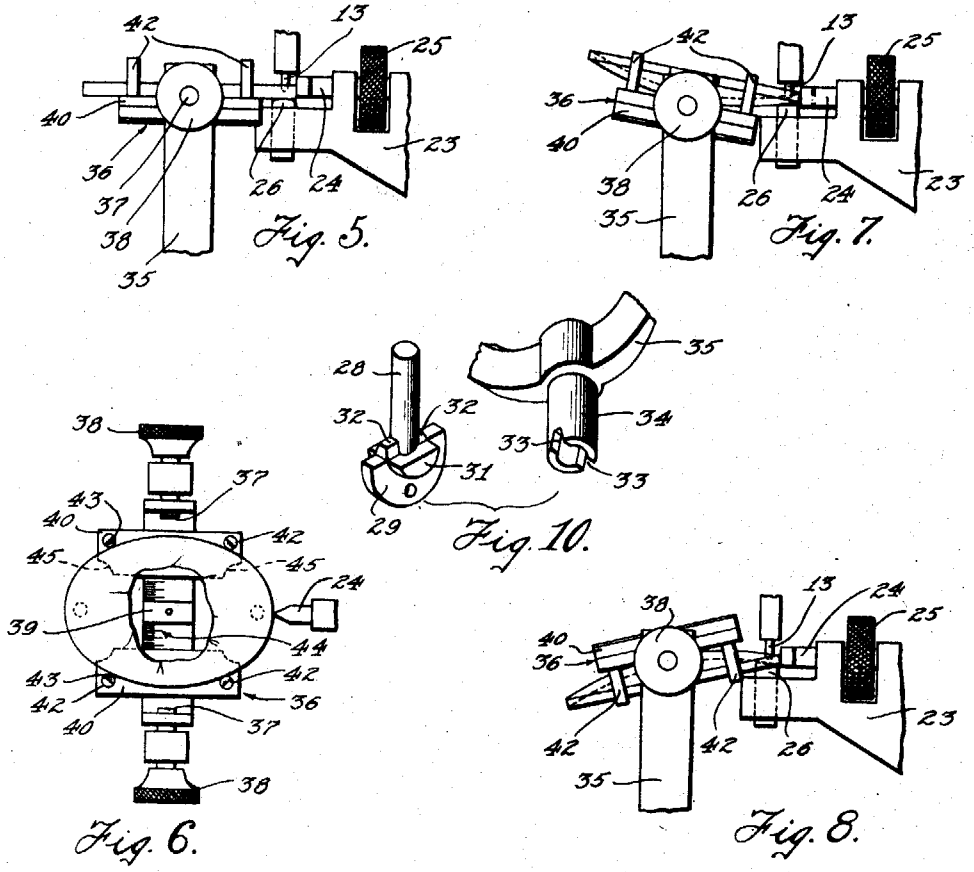
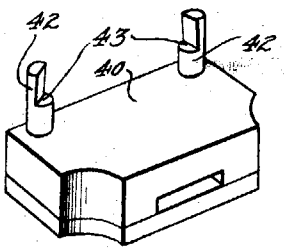
INVENTOR
Edward W. Clarke.
BY
Harry H. Styll
ATTORNEY Reissued Dec. 15, 1925.

Re. 16,227

UNITED STATES PATENT OFFICE.

EDWARD W. CLARKE, OF SILVER CREEK, NEW YORK, ASSIGNOR TO AMERICAN OPTICAL COMPANY, OF SOUTHBRIDGE, MASSACHUSETTS.

LENS-DRILLING MACHINE.

Original No. 1,447,761, dated March 6, 1923, Serial No. 393,518, filed July 2, 1920. Application for reissue filed July 9, 1923. Serial No. 650,477.

*To all whom it may concern:*

Be it known that I, EDWARD W. CLARKE, a citizen of the United States, residing at Silver Creek, in the county of Chautauqua and State of New York, have invented new and useful Improvements in Lens-Drilling Machines, of which the following is a specification.

One object of my present invention is the provision of a unitary lens drilling machine, adapted to be operated to the best advantage with the expenditure of a minimum amount of effort.

Another object of the invention is the provision of a lens drilling machine having in its standard a holder for drilling fluid and also having a dropper and means whereby with one hand the operator is enabled to depress the drilling bit and at the same time manipulate the dropper for the proper placing of drilling fluid on the lens.

Another object is the provision in a drilling machine of a highly advantageous lens holder characterized by the capacity to enable the operator with one mounting of a lens to drill the same half way through at one side of the lens and then half way through at the opposite side of the lens; the said holder being also characterized by its capacity to enable the operator on one mounting of the lens to drill both ends thereof, by its capacity to handle either flat or concavo-convex lenses, and by its capacity to bring about the drilling of a lens at one side or the other of the longitudinal center thereof.

To the attainment of the foregoing the invention consists in the improvement as hereinafter described and definitely claimed.

In the accompanying drawings, hereby made a part hereof:

Figures 5, 6, 7, and 8, are detail views making clear the construction of the lens holder and also making clear the capacity of the holder to handle concavo-convex as well as flat lenses.

Figure 9 is an enlarged detail view of one of the clamp members.

Figure 10 comprises disconnected views of parts included in the work holder.

Similar numerals of reference designate corresponding parts in all of the views of the drawings.

Figure 2:
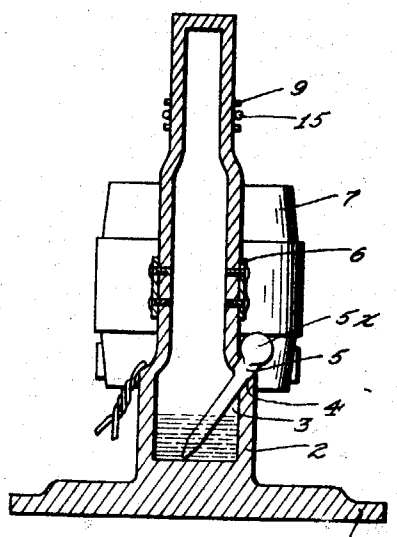
Figure 2 is a vertical section showing the drill fluid container in the lower portion of the machine standard and the hereinafter described dropper positioned therein.
Figure 1:
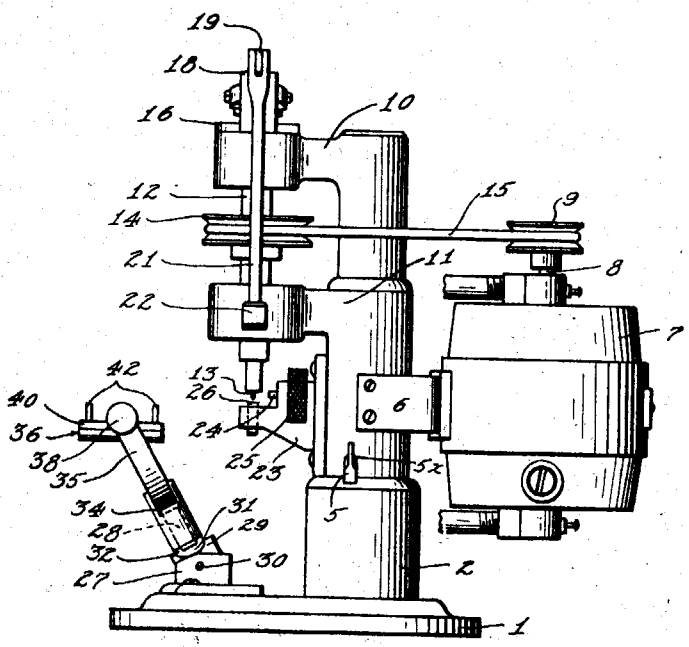
Figure 1 is a side elevation of a lens drilling machine constructed in accordance with my invention.
Figure 4:
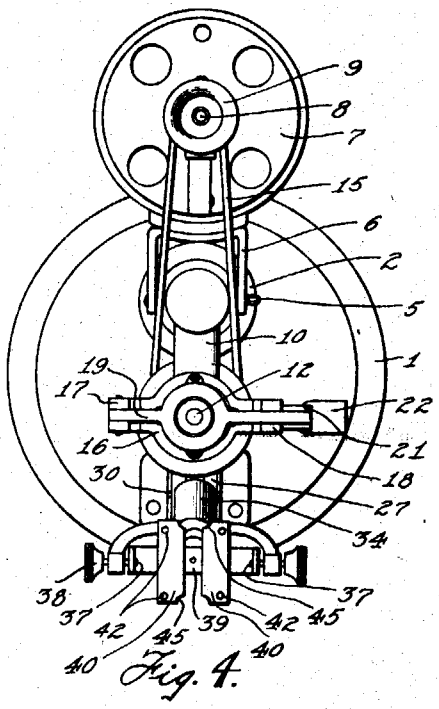
Figure 4 is a top plan view of the machine.

Among other elements my novel machine comprises a base 1 to which is fixed a standard 2, the two being preferably integral. The lower portion of the standard 2 is hollow to afford a container 3 for drilling fluid, and in the upper portion of the wall of the container is formed an opening 4 normally closed by the body of a removable dropper 5. When associated with the container 3 the said dropper 5 is arranged with its handle 5× at one side of the lower portion of the standard 2, as shown in Figures 1 and 2, for an important purpose hereinafter set forth.

Fixed to the standard 2 at an intermediate point in the length thereof is a bracket 6, and carried by the said bracket 6 is an electric motor 7 on the armature shaft 8 of which is a circumferentially grooved pulley 9.

Fixed to and extending forwardly from the upper portion of the standard 2 are arms 10 and 11 which are separated by an intervening space and are designed for the reception of the rotatable and rectilinearly movable drill spindle 12 which is provided at its lower end with a diamond bit 13 or an appropriate bit of any other type. Fixed on the spindle 12 and movable up and down and about its axis in the intervening space alluded to is a circumferentially grooved pulley 14 between which and the pulley 9 is arranged a band 15 possessed of stretching or elastic quality.

At the upper end of the standard 2 is a crown section 16 with upstanding arms 17 and 18, and pivoted to the arm 17 and movable vertically in a bifurcation of the arm 18 is a lever 19, normally pressed upwardly by a spring 20. The said lever 19 is connected with the upper end of the spindle 12 in the manner illustrated, i. e., in such manner that the spindle 12 is free to rotate in and independently of the lever 19 and yet downward and upward movements of the lever 19 will be attended by corresponding movements of the spindle.

Connected to and depending from the free end of the lever 19 is a handle 21 provided at its lower end with a hook 22 the said handle 21 with the hook 22 is arranged at the same side of the standard 2 as the before mentioned dropper 5. From this it follows an important advantage of my improvement which consists in the ability of the operator to depress the spindle 12 by the application of the middle finger of one hand to the hook 22 while grasping and manipulating the dropper 5 with the thumb and index finger of the same hand.

Figure 3:
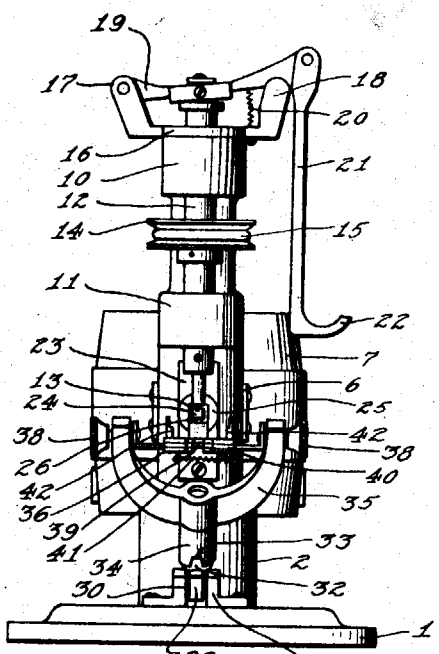
Figure 3 is a front elevation of the machine.

Fixed to and projecting forwardly from the standard 2 is a bracket 23 carried by which is a stop 24 adjustable through the medium of a knurled wheel 25. The said bracket 23 also carries an anvil 26 disposed in vertical alinement with the spindle 12 and bit 13. The lens holder of my improvement is made up of the following elements, viz: a pedestal member 27 fixed on the front portion of the base 1, a swinging journal 28 having a flattened end portion 29, pivoted at 30 in the member 27 and also having stop portions 31 and knife edge portions 32. The stop portions 31 are designed by cooperation with the member 27 to limit the swinging movements of the journal 28 forwardly and rearwardly, and the knife edge portions 32, Figures 1 and 3, are for cooperation with notches 33 in the lower end of the tubular stem 34 of a yoke 35. The said notches 33 are diametrically opposite each other and from this it follows that by lifting the yoke 35 to a slight extent, the said yoke may be swung about the journal 28 to reverse position and may then be detachably secured in such position by releasing the yoke so that on downward movement thereof the knife edge portions 32 will be received in the notches 33. In addition to the parts thus far enumerated the lens holder comprises a rotatable cradle 36. Said cradle 36 is arranged between the arms of the yoke 35 and is provided with trunnions 37 journaled in the end portions of the yoke and provided at their outer ends with knurled finger pieces 38. In its transverse center the cradle 36 is provided with a stop or abutment 39, Figure 6, and slidable on the cradle 36 at opposite sides of the said stop 39 are clamping members 40 which are connected together through the medium of a retractile spring 41, Figure 3, which tends to draw and yieldingly hold the members 40 against the opposite sides of the stop 39. On each clamping member 40 are two lens engaging pegs 42 which are formed of plastic material, wood or any other material that will not be liable to chip the edges of the lenses. One of the said pegs is shown enlarged in Figure 9. Each of the said pegs 42 is provided at its inner side and at an intermediate point of its height with a rest 43, and the upper portion of the inner face of each peg is preferably inclined inwardly toward the upper end of the peg from the inner edge of the rest 43. This provision is advantageous inasmuch as it enables the group of pegs 43 to securely retain a concavo-convex lens which said lens is superimposed on the rests 43, and the clamping members 40 are held by the spring 41 under yielding pressure against the edge of the lens. The upper sides of the clamping members 40 are flat in order to support two flat lenses which may be arranged edgewise between the pegs 42 and the lowermost one of which may be arranged flatwise directly against the said flat sides of the members 40.

The upper side of the cradle 36 is preferably graduated in millimeters, as indicated by 44 so that by referring to the said graduations and properly positioning the clamping members 40 with respect thereto the operator can drill a hole in a lens at various predetermined distances from the longitudinal center of the lens. The inner corners of the clamping members 40 are preferably, though not necessarily, recessed as indicated by 45 and shown by dotted lines in Figure 6 to facilitate the placing of a lens on said members.

In the practical operation of the machine and in the practical manipulation or use of the lens holder referred to, it will be apparent that when either a flat lens or a concavo-convex lens is positioned between the pegs 42 on the clamping members 40 carried by the cradle 36, the lens may be drilled at both sides and near both ends thereof, and this with the greatest facility. This will be better understood when it is stated that with the lens properly mounted the lens may be swung with the yoke 35 so that one of its end portions will be positioned between the anvil 26 and the bit 13. While the lens is thus positioned it may be drilled half way through its thickness. Then by the operator turning the cradle 36 about its axis the opposite side and opposite end portion of the lens may be presented to the bit 13 to be bored through one half of its thickness. Then by the operator lifting the yoke 35 and turning the yoke about its axis on the journal 28 and then depressing the yoke to re-engage the same with the knife edge portions 32 the lens will be positioned for the presentation of the opposite side of the first named end of the lens to the bit 13, and then by turning the cradle 36 about its axis the operator is enabled to present to the bit 13 the opposite side of the second named end portion of the lens. In this way the desired drilling of the lens first at one side and then at the opposite side thereof may be expeditiously and easily accomplished. Again it will be appreciated in the drilling of concavo-convex lenses the operator is enabled by taking hold of one or both of the finger pieces 38 to adjust and hold the lens so that the drill bit 13 will operate in a line at right angles to the plane of the surface of the lens as is always desirable. Incidental to the drilling operation the operator is enabled to depress the spindle 12 by the application of the middle finger of one hand to the hook 22 of the handle 21 while with the thumb and index finger of the same hand he manipulates the dropper 5 for the proper application of drilling fluid to the lens that is being drilled. This will be appreciated as an important advantage when facility and expedition of operation are taken into consideration.

It will be further apparent from the foregoing that my improvement presents a unitary, mobile lens drilling machine adapted to be readily handled as a whole.

Having described my invention, what I claim and desire to secure by Letters Patent, is:

1. In combination with the base, frame, and rotatable spindle of a lens drilling machine, a lens holder pivoted to the base and adapted to present one surface of the lens to the drill, and means for subsequently turning the lens holder to present the opposite surface of the lens to the drill.

2. A lens holder comprising a pedestal, a swinging journal pivoted to the pedestal and having a stop portion to engage the pedestal and also having knife edge portions, a yoke having a tubular stem notched to receive said knife edge portions and movable vertically on and about the journal, a cradle mounted to turn about its axis between the arms of the yoke and having a finger piece, clamp members slidable on said cradle, a retractile spring connecting said clamping members, pegs on the clamping members and having rests and also having their inner faces inclined inwardly above the rests, and a stop on the cradle and against which the clamping members are normally held; the said cradle being graduated.

3. In a lens drilling machine, a base, a frame thereon, a spindle rotatable in the frame, a rod pivoted to the base on an axis perpendicular to that of the spindle, a sleeve carried by the rod and capable of complete rotation thereon, means for locking the sleeve against rotation, and lens clamping means capable of complete rotation on the sleeve.

4. A lens drilling machine comprising a frame, a rotatable drill spindle mounted therein, a rotatable yoke adapted to swing on an axis at right angles to its center of rotation, and lens clamping means carried by the yoke whereby opposite surfaces of a lens may be alternately presented to the drill spindle.

5. A lens drilling machine comprising a frame, a rotatable drill spindle, an anvil in line with the spindle, a lens clamp adjacent the anvil, and means permitting complete rotation of the lens clamp in two perpendicular planes whereby to present the opposite surfaces of the lens to the drill at diametrically opposed positions.

6. In combination with the base, frame and rotatable spindle of a lens drilling machine, a lens holder pivoted to the base and adapted to present one surface of the lens to the drill, means for subsequently turning the lens holder to present the opposite surface of the lens to the drill, and means for turning the lens holder to bring the partially drilled hole in alignment with the drill.

EDWARD W. CLARKE.